US009299041B2

(12) United States Patent
Tsumura et al.

(10) Patent No.: US 9,299,041 B2
(45) Date of Patent: Mar. 29, 2016

(54) OBTAINING DATA FROM UNSTRUCTURED DATA FOR A STRUCTURED DATA COLLECTION

(71) Applicants: Michael Tsumura, Vancouver (CA); Yuru Wang, Coquitlam (CA); JohnPaul Burbank, Vancouver (CA); Jennifer Sam, Burnaby (CA); George Sun, Coquitlam (CA)

(72) Inventors: Michael Tsumura, Vancouver (CA); Yuru Wang, Coquitlam (CA); JohnPaul Burbank, Vancouver (CA); Jennifer Sam, Burnaby (CA); George Sun, Coquitlam (CA)

(73) Assignee: Business Objects Software Ltd., Dublin (IE)

( * ) Notice: Subject to any disclaimer, the term of this patent is extended or adjusted under 35 U.S.C. 154(b) by 411 days.

(21) Appl. No.: 13/842,228

(22) Filed: Mar. 15, 2013

(65) Prior Publication Data
US 2014/0278406 A1    Sep. 18, 2014

(51) Int. Cl.
| | |
|---|---|
| G06F 7/00 | (2006.01) |
| G06Q 10/06 | (2012.01) |
| G06F 17/30 | (2006.01) |
| G06Q 40/00 | (2012.01) |
| G10L 15/18 | (2013.01) |
| G10L 15/183 | (2013.01) |
| G06F 17/24 | (2006.01) |

(52) U.S. Cl.
CPC ............ *G06Q 10/06* (2013.01); *G06F 17/3061* (2013.01); *G06Q 40/00* (2013.01); *G06F 17/246* (2013.01); *G10L 15/183* (2013.01); *G10L 15/1822* (2013.01)

(58) Field of Classification Search
CPC .. G06Q 10/06; G10L 15/1822; G10L 15/183; G06F 17/3061
USPC .......................................................... 707/736
See application file for complete search history.

(56) References Cited

U.S. PATENT DOCUMENTS

| | | |
|---|---|---|
| 4,994,967 A | 2/1991 | Asakawa |
| 5,694,592 A | 12/1997 | Driscoll |
| 5,873,056 A | 2/1999 | Liddy et al. |
| 5,963,940 A | 10/1999 | Liddy et al. |
| 6,182,029 B1 | 1/2001 | Friedman |
| 6,549,897 B1 | 4/2003 | Katariya et al. |
| 6,741,959 B1 | 5/2004 | Kaiser |
| 7,027,974 B1 | 4/2006 | Busch et al. |
| 7,036,080 B1 | 4/2006 | James et al. |
| 7,181,451 B2 | 2/2007 | Dehlinger et al. |
| 7,283,846 B2 | 10/2007 | Spriestersbach et al. |
| 7,324,936 B2 | 1/2008 | Saldanha et al. |
| 7,558,731 B1 | 7/2009 | Hodjat et al. |
| 7,676,489 B2 | 3/2010 | Kaiser |
| 7,792,814 B2 | 9/2010 | Cohen |

(Continued)

OTHER PUBLICATIONS

"Expensify—Android Apps on Google Play", Dec. 9, 2012.*

(Continued)

*Primary Examiner* — Ajith Jacob
(74) *Attorney, Agent, or Firm* — Fish & Richardson P.C.

(57) ABSTRACT

Techniques for obtaining data from unstructured data for a structured data collection include receiving unstructured data that includes text; identifying an attribute associated with a structured data collection; obtaining at least one of historical data associated with the attribute or additional data associated with a user of the computing system; identifying one or more terms from the unstructured data as being associated with the attribute based on at least one of the historical data or the additional data; and storing the identified one or more terms in a data record of the unstructured data collection.

21 Claims, 5 Drawing Sheets

(56) References Cited

U.S. PATENT DOCUMENTS

| | | | |
|---|---|---|---|
| 7,849,048 B2 | 12/2010 | Langseth et al. | |
| 7,992,078 B2 | 8/2011 | Penner et al. | |
| 8,036,877 B2 | 10/2011 | Treadgold et al. | |
| 8,185,509 B2 | 5/2012 | Cras | |
| 8,229,883 B2 | 7/2012 | Brauer et al. | |
| 8,271,429 B2 | 9/2012 | Ghuneim et al. | |
| 8,468,033 B2 | 6/2013 | Gunn | |
| 8,560,480 B2 | 10/2013 | Du et al. | |
| 8,719,308 B2 | 5/2014 | Xiong et al. | |
| 2002/0120598 A1 | 8/2002 | Shadmon et al. | |
| 2004/0148278 A1 | 7/2004 | Milo et al. | |
| 2005/0108630 A1 | 5/2005 | Wasson et al. | |
| 2006/0053127 A1 | 3/2006 | Wen et al. | |
| 2006/0053133 A1 | 3/2006 | Parkinson | |
| 2006/0224682 A1* | 10/2006 | Inmon | 709/206 |
| 2008/0084573 A1 | 4/2008 | Horowitz et al. | |
| 2008/0104032 A1 | 5/2008 | Sarkar | |
| 2008/0208805 A1 | 8/2008 | Wang et al. | |
| 2009/0259622 A1 | 10/2009 | Kolz et al. | |
| 2010/0114899 A1* | 5/2010 | Guha et al. | 707/741 |
| 2011/0208681 A1 | 8/2011 | Kuecuekyan | |
| 2012/0136649 A1 | 5/2012 | Freising et al. | |
| 2012/0259865 A1 | 10/2012 | Lakshmanan et al. | |
| 2012/0260265 A1 | 10/2012 | Doganata et al. | |
| 2013/0086101 A1 | 4/2013 | Heidasch | |
| 2013/0110842 A1* | 5/2013 | Donneau-Golencer et al. | 707/741 |
| 2013/0117012 A1 | 5/2013 | Orlin et al. | |
| 2013/0166568 A1 | 6/2013 | Binkert et al. | |
| 2013/0166597 A1 | 6/2013 | Khan et al. | |
| 2013/0318119 A1 | 11/2013 | Dalal | |

OTHER PUBLICATIONS

Expensify—Android Apps on Google Play; http://play.google.com/store/apps/details?id=org.me.mobiexpensifyg&hl=en; [last visited on Jan. 10, 2013], 2 pages.

Shoeboxed Receipt Tracker and Receipt Reader for iPhone, iPod touch, and iPad on the iTunes App Store; 3 pages; http://itunes.apple.com/us/app/shoeboxed/id322143854?mt=8 [last visited Jan. 10, 2013].

Xpen$er—Mobile Expense, Time, and Mileage Tracker; 4 pages; http://xpenser.com/ [last visited Jan. 10, 2013].

Semi-structured Data: Happy 10th Birthday! - Al3:::Adaptive Information; 14 pages; http://www.mkbergman.com/153/semi-structured-data-happy-10th-birthday/ [last visited Jan. 22, 2013].

Office Action issued for U.S. Appl. No. 13/842,987 on Feb. 10, 2015; 23 pages.

* cited by examiner

400

I ate at Boston Market in New York with Tom White. It cost $19.00.

405

Restaurant: Boston Market

City: New York

Price: $19.00

Attendees: Tom White

Receipt:

410

804-686-8070
 TRANSACTION RECORD 
Tran. * 1 21544
User ID : ****
Giftcard Redeem
xxxxxxxxxxxx6078 S
Amount          $16.00
TIP              $3.00
TOTAL           $19.00
New Balance    $442.10
APPROVED 442.10
          00  442.10
CACTUSS1 / CACTUSC1
Invoice  01    195618
2012 / 07 / 25  12:50:56

Save

FIG. 4

| | | expense · Updated 17 minutes ago | | | | ☆ |
|---|---|---|---|---|---|---|
| | | Full Screen \| Explore Data \| Re-Upload \| More Actions ▼ | | | | |
| | amount | created_at | attendees | place | location | category |
| 201 | $ 50 | 26-Jul-12 16:14:50 | Bob Dole | Taco Bell | Los Angeles | Meal Expense |
| 202 | $ 40 | 26-Jul-12 16:16:54 | | Restaurant: The Sandbar | City: Vancouver | Meal Expense |
| 203 | $ 20 | 26-Jul-12 16:44:42 | | McDonald's | NO INFO | Meal Expense |
| 204 | $ 10 | 26-Jul-12 17:13:58 | John Smith | Mahoney's Grill | Atlanta | Meal Expense |
| 205 | $ 15 | 26-Jul-12 17:18:23 | Derek Smith | Boston Pizza | Chicago | Meal Expense |
| 206 | $ 14 | 26-Jul-12 17:19:07 | Michael Omae | Restaurant: Cactus Club C | City: Vancouver | Meal Expense |
| 207 | $ 15 | 26-Jul-12 17:19:41 | Michael Tsumura | the Cactus Club Cafe | Vancouver | Meal Expense |
| 208 | $ 15 | 26-Jul-12 17:20:04 | Michael Tsumura | Restaurant: Menchie's Fro | City: Vancouver | Meal Expense |
| 209 | $ 40 | 27-Jul-12 10:07:21 | Dan Marton | White Spot | Miami | Meal Expense |
| 210 | $ 2 | 27-Jul-12 10:07:50 | Bill Smith | Picadilly Pub | Paris | Meal Expense |
| 211 | $ 12 | 27-Jul-12 10:09:54 | Bill Barber | l'oreal cafe | Paris | Meal Expense |
| 212 | $ 25 | 27-Jul-12 10:37:14 | John Smith | McDonald's | Paris | Meal Expense |
| 213 | $ 10 | 27-Jul-12 12:25:06 | Bill Cosby | the Shake Shack | New York | Meal Expense |
| 214 | $ 40 | 30-Jul-12 13:27:19 | Vince Carter | Bob's submarine | Toronto | Meal Expense |
| 215 | $ 40 | 30-Jul-12 13:27:51 | Ju Wu, Yuru Wang | Restaurant: Glowbal Grill | City: Vancouver | Meal Expense |
| 216 | $ 40 | 30-Jul-12 14:07:40 | | global restaurant | Vancouver | Meal Expense |
| 217 | $ 10 | 30-Jul-12 15:27:15 | Peyton Manning | Joe's Taco house | Miami | Meal Expense |
| 218 | $ 0 | 30-Jul-12 15:27:47 | | Restaurant: Rodney's Oys | City: Vancouver | Meal Expense |
| 219 | $ 30 | 01-Aug-12 11:18:33 | Tom White | Boston market | New York | Meal Expense |

▼ ITEMS
All Items
Favorites — 502
Text Items
Tables
Datasets
Visualizations
Files ▼ RECENT
expense
Meal By Location
expense timeline
McDonald's Tracker
Text
Show More

OBTAINING DATA FROM UNSTRUCTURED DATA FOR A STRUCTURED DATA COLLECTION

TECHNICAL BACKGROUND

This disclosure relates to obtaining data from unstructured data for a structured data collection.

BACKGROUND

A structured data collection is an organized collection of data. Data in a structured data collection reside in fixed fields within a record or a file. Databases and spreadsheets are examples of structured data collections. Traditionally, a user manually entered data into a structured data collection by selecting a field in a data record and typing text into the field using a keyboard. Manually entering data into a data record using a keyboard, however, may be inflexible, inconvenient, inefficient, and time consuming.

SUMMARY

This disclosure describes systems, methods, apparatus, and computer-readable media for obtaining data from unstructured data for a structured data collection including, for example, the features of receiving unstructured data that includes text; identifying an attribute associated with a structured data collection; obtaining at least one of historical data associated with the attribute or additional data associated with a user of the computing system; identifying one or more terms from the unstructured data as being associated with the attribute based on at least one of the historical data or the additional data; and storing the identified one or more terms in a data record of the unstructured data collection.

In a first aspect combinable with any of the general embodiments, receiving unstructured data that includes text includes receiving a natural language utterance; and converting the natural language utterance into the text.

In a second aspect combinable with any of the previous aspects, receiving unstructured data that includes text includes receiving an image containing the text; and performing optical character recognition on the image to identify the text.

In a third aspect combinable with any of the previous aspects, obtaining historical data associated with the attribute includes obtaining as set of one or more terms previously identified as being associated with the attribute; and identifying one or more terms from the unstructured data as being associated with the attribute based on the historical data includes identifying one or more terms from the unstructured data that is included in the set of one or more terms previously identified as being associated with the attribute.

In a fourth aspect combinable with any of the previous aspects, obtaining additional data associated with a user of the computing system includes at least one of (i) obtaining a location associated with the user or (ii) accessing a contacts database associated with the user; and identifying one or more terms from the unstructured data as being associated with the attribute based on the additional data includes at least one of (i) identifying one or more terms from the unstructured data that is associated with the location and the location is associated with the attribute, or (ii) identifying one or more terms from the unstructured data that is associated with information in the contacts database and the information in the contacts database is associated with the attribute.

A fifth aspect combinable with any of the general embodiments includes receiving an input from the user to associate the one or more terms with the attribute; and including the one or more terms in the historical data associated with the attribute.

A sixth aspect combinable with any of the general embodiments includes receiving an input from an administrator of the structured data collection to associate the attribute with the structured data collection, the attribute being from a predetermined set of available attributes, and each attribute from the predetermined set of available attributes being associated with historical data.

Particular implementations of the subject matter described in this disclosure can be implemented so as to realize none, one, or more of the following advantages. By obtaining data from unstructured data for a structured data collection, a user interface can be provided to users where the users can input unstructured data, which may be more convenient and efficient than manual entry of data. The computing system may increase the chances of correctly identifying one or more terms in the unstructured data by using rules, name catalogs, and historical data associated with attributes of the structured data collection, information from other unstructured data, additional data associated with a user of the computing system, and data from external systems and services to classify the terms and to resolve ambiguities. The computing system may use the historical data and the correctly identified terms of the unstructured data to improve and expand the rules and name catalogs used to obtain data from the unstructured data. The computing system may provide a predefined set of attributes from which application developers and database administrators can select to include in a structured data collection. By providing a predefined set of attributes from which selected attributes are included in the structured data collection, application developers and database administrators have the flexibility to change the attributes included in the structured data collection and thus the data that is to be obtained from the unstructured data as the needs and demands of the users of the application and the structured data collection change. The ability to change the attributes of the structured data collection at runtime may increase the chances of correctly identifying one or more terms in the unstructured data for the structured data collection.

These general and specific aspects may be implemented using a device, system or method, or any combinations of devices, systems, or methods. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions. The details of one or more implementations are set forth in the accompanying drawings and the description below. Other features, objects, and advantages will be apparent from the description and drawings, and from the claims.

DESCRIPTION OF DRAWINGS

FIG. 4 shows an example of a user interface of an expense report application that displays the unstructured data received from the user; and FIG. 5 shows an example of a user interface that displays data from a structured data collection.

DETAILED DESCRIPTION

In a general implementation of the present disclosure, a computing system obtains data from unstructured data for a structured data collection. A structured data collection can be, for example, a database table or a spreadsheet table. A table is a set of data elements or values that are organized using a model of vertical columns and horizontal rows of cells. A category is the name of the table. The attributes of the category are the columns of the table, where each column may be identified by an attribute name. A data element or value may be stored in a cell, which is referenced by a column and a row. A data element stored in a cell is associated with the attribute represented by the column in which the data element in stored.

Unstructured data, on the other hand, typically has no identifiable structure. The contents of word processing documents, email messages, digital images, digital audio, and digital videos are some examples of unstructured data. Because unstructured data has no identifiable structure, the data obtained from unstructured data may be ambiguous. For example, unstructured data that includes the text string "Boston Market" may result in an ambiguity for the term "Boston." The computing system may identify the term "Boston" as being associated with a city attribute and the terms "Boston Market" as being associated with a restaurant attribute. The computing system may increase the chances of correctly identifying one or more terms in the unstructured data by using rules, name catalogs, and historical data associated with the attribute, information from other unstructured data, additional data associated with a user of the computing system, and data from external systems and services to classify the terms or phrases in the unstructured data and to resolve ambiguities.

Figure 1:
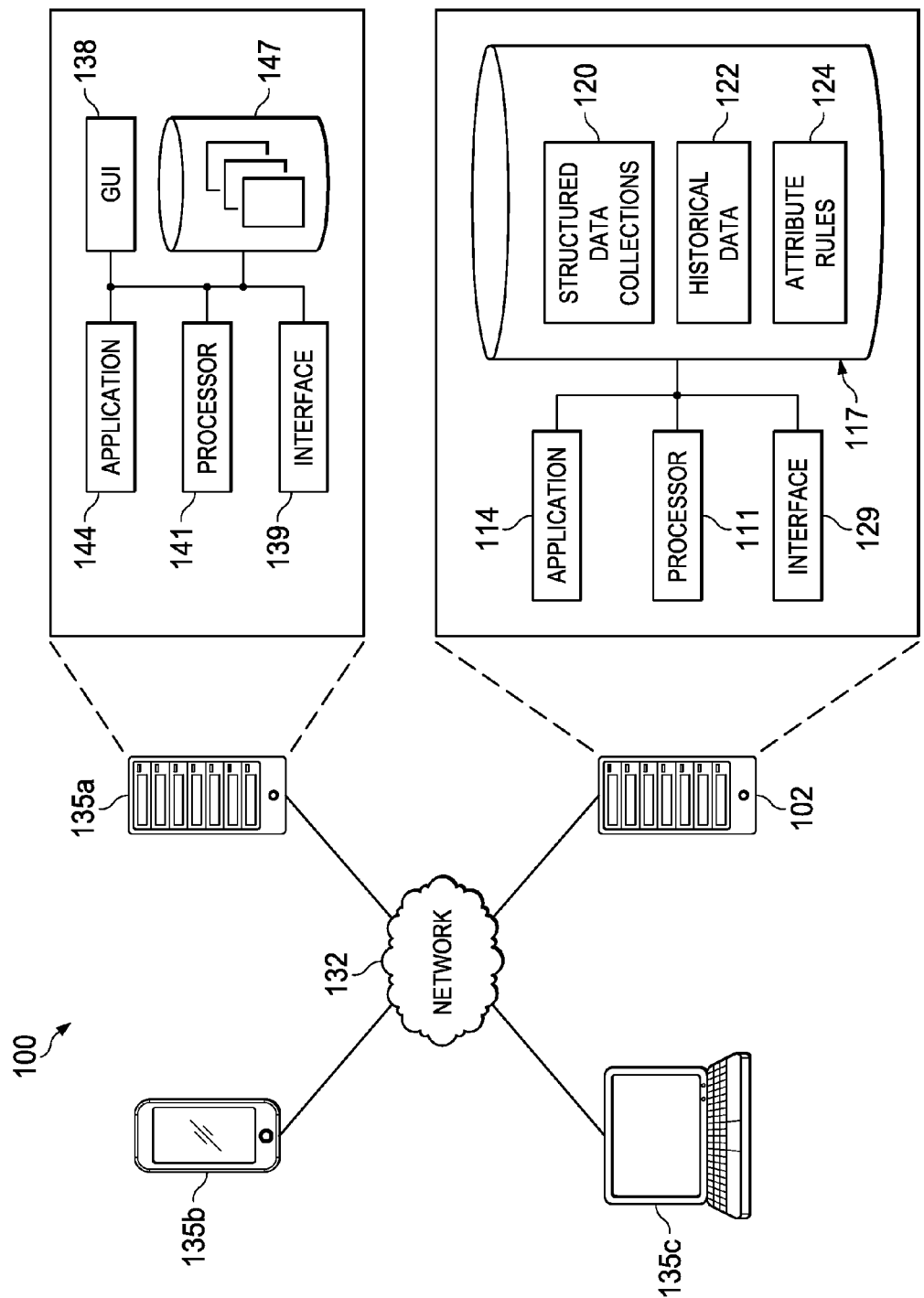
FIG. 1 shows an example of a distributed computing system environment operable to obtain data from unstructured data for a structured data collection.

FIG. 1 shows an example of a distributed computing system environment 100 operable to obtain data from unstructured data for a structured data collection. The environment 100 includes or is communicably coupled with a server 102 and one or more clients 135, at least some of which communicate across network 132. The server 102 stores one or more hosted applications 114, where at least a portion of the hosted applications 114 are executed via requests and responses sent to users or clients within and communicably coupled to the environment 100. An example of a hosted application 114 is a data extraction application. An example of a data extraction application is an application that obtains data from unstructured data for a structured data collection. The data extraction application is executed by the server 102 to identify one or more terms from unstructured data as being associated with a structured data collection.

In some instances, the server 102 may store a plurality of various hosted applications 114, while in other instances, the server 102 may be a dedicated server meant to store and execute only a single hosted application 114. In some instances, the server 102 may include a web server, where the hosted applications 114 represent one or more web-based applications accessed and executed via network 132 by the clients 135 of the system to perform the programmed tasks or operations of the hosted application 114. At a high level, the server 102 includes an electronic computing device operable to receive, transmit, process, store, or manage data and information associated with the environment 100. Specifically, the server 102 illustrated in FIG. 1 is responsible for receiving application requests from one or more client applications 144 associated with the clients 135 of environment 100 and responding to the received requests by processing said requests in the associated hosted application 114, and sending the appropriate response from the hosted application 114 back to the requesting client application 144.

In addition to requests from the external clients 135 illustrated in FIG. 1, requests associated with the hosted applications 114 may also be sent from internal users, external or third-party customers, other automated applications, as well as any other appropriate entities, individuals, systems, or computers. As used in the present disclosure, the term "computer" is intended to encompass any suitable processing device. For example, although FIG. 1 illustrates a single server 102, environment 100 can be implemented using two or more servers 102, as well as computers other than servers, including a server pool. Indeed, server 102 may be any computer or processing device such as, for example, a blade server, general-purpose personal computer (PC), Macintosh, a virtual server, or any other suitable device. In other words, the present disclosure contemplates computers other than general purpose computers, as well as computers without conventional operating systems. Further, illustrated server 102 may be adapted to execute any operating system, including Linux, UNIX, Windows, Mac OS, or any other suitable operating system.

In the present implementation, and as shown in FIG. 1, the server 102 includes a processor 111, an interface 129, a memory 117, and one or more hosted applications 114. The interface 129 is used by the server 102 for communicating with other systems in a client-server or other distributed environment (including within environment 100) connected to the network 132 (e.g., client 135, as well as other systems communicably coupled to the network 132). Generally, the interface 129 includes logic encoded in software and/or hardware in a suitable combination and operable to communicate with the network 132. More specifically, the interface 129 may include software supporting one or more communication protocols associated with communications such that the network 132 or interface's hardware is operable to communicate physical signals within and outside of the illustrated environment 100.

Generally, the network 132 facilitates wireless or wireline communications between the components of the environment 100 (i.e., between the server 102 and the clients 135), as well as with any other local or remote computer, such as additional clients, servers, or other devices communicably coupled to network 132 but not illustrated in FIG. 1. The network 132 is illustrated as a single network in FIG. 1, but may be a continuous or discontinuous network without departing from the scope of this disclosure, so long as at least a portion of the network 132 may facilitate communications between senders and recipients. The network 132 may be all or a portion of an enterprise or secured network, while in another instance at least a portion of the network 132 may represent a connection to the Internet. In some instances, a portion of the network 132 may be a virtual private network (VPN), such as, for example, the connection between the client 135 and the server 102.

Further, all or a portion of the network 132 can include either a wireline or wireless link. Example wireless links may include 802.11a/b/g/n, 802.20, WiMax, and/or any other appropriate wireless link. In other words, the network 132 encompasses any internal or external network, networks, subnetwork, or combination thereof operable to facilitate communications between various computing components inside and outside the illustrated environment 100. The network 132 may communicate, for example, Internet Protocol (IP) packets, Frame Relay frames, Asynchronous Transfer Mode (ATM) cells, voice, video, data, and other suitable information between network addresses. The network 132 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, server 102 includes a processor 111. Although illustrated as a single processor 111 in FIG. 1, two or more processors may be used according to particular needs, desires, or particular embodiments of environment 100. Each processor 111 may be a central processing unit (CPU), a blade, an application specific integrated circuit (ASIC), a field-programmable gate array (FPGA), or another suitable component. Generally, the processor 111 executes instructions and manipulates data to perform the operations of server 102 and, specifically, the one or more plurality of hosted applications 114. Specifically, the server's processor 111 executes the functionality required to receive and respond to requests from the clients 135 and their respective client applications 144, as well as the functionality required to perform the other operations of the hosted application 114.

Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, ABAP, Visual Basic, assembler, Perl, any suitable version of 4GL, as well as others. While portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated environment 100, processor 111 executes one or more hosted applications 114 on the server 102.

At a high level, each of the one or more hosted applications 114 is any application, program, module, process, or other software that may execute, change, delete, generate, or otherwise manage information according to the present disclosure, particularly in response to and in connection with one or more requests received from the illustrated clients 135 and their associated client applications 144. In certain cases, only one hosted application 114 may be located at a particular server 102. In others, a plurality of related and/or unrelated hosted applications 114 may be stored at a single server 102, or located across a plurality of other servers 102, as well. In certain cases, environment 100 may implement a composite hosted application 114. For example, portions of the composite application may be implemented as Enterprise Java Beans (EJBs) or design-time components may have the ability to generate runtime implementations into different platforms, such as J2EE (Java 2 Platform, Enterprise Edition), ABAP (Advanced Business Application Programming) objects, or Microsoft's .NET, among others. In some embodiments, portions of the composite application may be implemented through a single enterprise-class solution for data integration, data quality, data profiling, and text analysis.

Additionally, the hosted applications 114 may represent web-based applications accessed and executed by remote clients 135 or client applications 144 via the network 132 (e.g., through the Internet). Further, while illustrated as internal to server 102, one or more processes associated with a particular hosted application 114 may be stored, referenced, or executed remotely. For example, a portion of a particular hosted application 114 may be a web service associated with the application that is remotely called, while another portion of the hosted application 114 may be an interface object or agent bundled for processing at a remote client 135. Moreover, any or all of the hosted applications 114 may be a child or sub-module of another software module or enterprise application (not illustrated) without departing from the scope of this disclosure. Still further, portions of the hosted application 114 may be executed by a user working directly at server 102, as well as remotely at client 135.

The illustrated server 102 also includes memory 117. Memory 117 may include any memory or database module and may take the form of volatile or non-volatile memory including, without limitation, magnetic media, optical media, random access memory (RAM), read-only memory (ROM), removable media, or any other suitable local or remote memory component. Memory 117 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 102 and its one or more hosted applications 114. For example, memory 117 may store a structured data collections 120, historical data 122, and attribute rules 124 that are used by the server 102 to identify one or more terms from unstructured data as being associated with a structured data collection. Additionally, memory 117 may include any other appropriate data, such as VPN applications, firmware logs and policies, firewall policies, a security or access log, print or other reporting files, as well as others.

The illustrated environment of FIG. 1 also includes one or more clients 135. Each client 135 may be any computing device operable to connect to or communicate with at least the server 102 and/or via the network 132 using a wireline or wireless connection. Further, as illustrated by client 135*a*, each client 135 includes a processor 141, an interface 139, a graphical user interface (GUI) 138, a client application 144, and a memory 147. In general, each client 135 includes an electronic computer device operable to receive, transmit, process, and store any appropriate data associated with the environment 100 of FIG. 1.

There may be any number of clients 135 associated with, or external to, environment 100. For example, while illustrated environment 100 includes three clients (135*a*, 135*b*, and 135*c*), alternative implementations of environment 100 may include a single client 135 communicably coupled to the server 102, or any other number suitable to the purposes of the environment 100. Additionally, there may also be one or more additional clients 135 external to the illustrated portion of environment 100 that are capable of interacting with the environment 100 via the network 132. Further, the term "client" and "user" may be used interchangeably as appropriate without departing from the scope of this disclosure.

Moreover, while each client 135 is described in terms of being used by a single user, this disclosure contemplates that many users may use one computer, or that one user may use multiple computers. As used in this disclosure, client 135 is intended to encompass a personal computer, touch screen terminal, workstation, network computer, kiosk, wireless data port, smart phone, personal data assistant (PDA), one or more processors within these or other devices, or any other suitable processing device. For example, each client 135 may include a computer that includes an input device, such as a keypad, touch screen, mouse, or other device that can accept user information, and an output device that conveys information associated with the operation of the server 102 (and hosted application 114) or the client 135 itself, including digital data, visual information, the client application 144, or the GUI 138. Both the input and output device may include fixed or removable storage media such as a magnetic storage media, CD-ROM, or other suitable media to both receive input from and provide output to users of the clients 135 through the display, namely, the GUI 138.

Further, the illustrated client 135 includes a GUI 138 including a graphical user interface operable to interface with at least a portion of environment 100 for any suitable purpose, including generating a visual representation of the client application 144 (in some instances, the client's web browser) and the interactions with the hosted application 114, including the responses received from the hosted application 114 received in response to the requests sent by the client application 144. Generally, through the GUI 138, the user is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, the GUI 138 can represent any graphical user interface, including but not limited to, a web browser, touch screen, or command line interface (CLI) that processes information in environment 100 and efficiently presents the information results to the user.

In general, the GUI 138 may include a plurality of user interface (UI) elements, some or all associated with the client application 144, such as interactive fields, pull-down lists, and buttons operable by the user at client 135. These and other UI elements may be related to or represent the functions of the client application 144, as well as other software applications executing at the client 135. In particular, the GUI 138 may be used to present the client-based perspective of the hosted application 114, and may be used (as a web browser or using the client application 144 as a web browser) to view and navigate the hosted application 114, as well as various web pages located both internal and external to the server, some of which may be associated with the hosted application 114. For purposes of the present location, the GUI 138 may be a part of or the entirety of the client application 144, while also merely a tool for displaying the visual representation of the client and hosted applications' 114 actions and interactions. In some instances, the GUI 138 and the client application 144 may be used interchangeably, particularly when the client application 144 represents a web browser associated with the hosted application 114.

While FIG. 1 is described as containing or being associated with a plurality of elements, not all elements illustrated within environment 100 of FIG. 1 may be utilized in each alternative implementation of the present disclosure. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
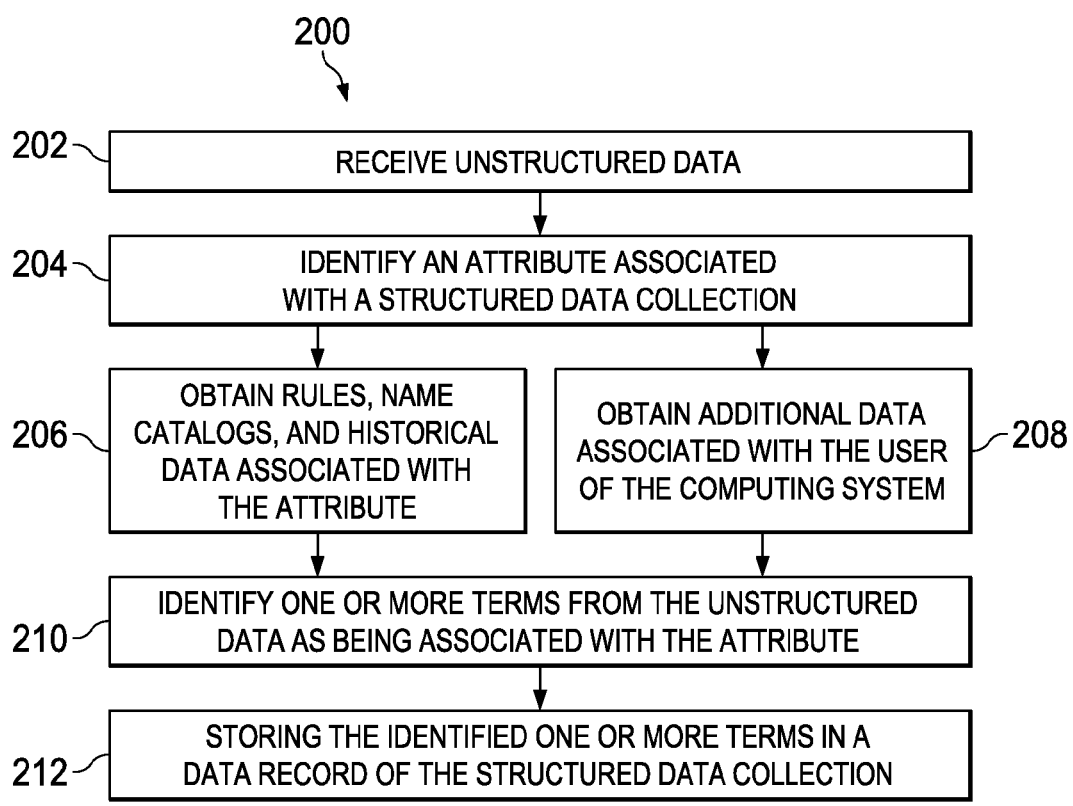
FIG. 2 shows a flowchart of examples of operations for obtaining data from unstructured data for a structured data collection.

FIG. 2 shows a flowchart of examples of operations 200 performed by a computing system of one or more computers, e.g., the server 102 of FIG. 1, to obtain data from unstructured data for a structured data collection. For purposes of illustration and without loss of generality, the operations 200 of FIG. 2 will be described with respect to an expense report application executed by the computing system.

In FIG. 2, the computing system receives unstructured data at 202. Unstructured data typically has no pre-defined model and may be irregular and ambiguous. The contents of word processing documents, email messages, web pages, digital images, digital audio, and digital videos are some examples of unstructured data. The computing system identifies text in the unstructured data and performs text analysis and part-of-speech tagging on the text. The computing system may use text of unstructured data to identify data for the structured data collection or to resolve ambiguities in data obtained from other unstructured data.

Figure 3:
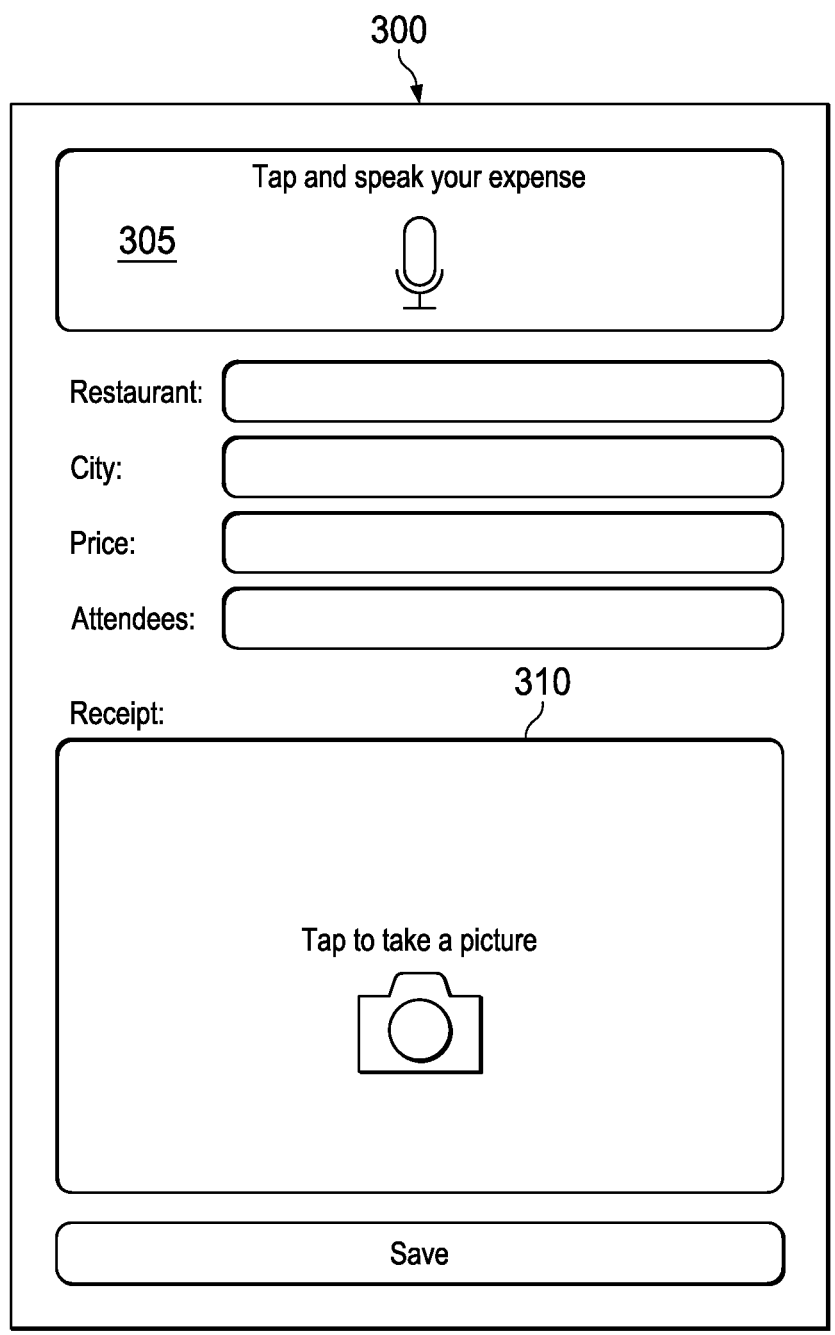
FIG. 3 shows an example of a user interface of an expense report application that accepts unstructured data via user input.

FIG. 3 shows an example of a user interface 300 of an expense report application that accepts unstructured data via user input. The user interface 300 includes a region within box 305 that a user can tap to record a natural language utterance describing the details of the user's expenses. The user interface 300 includes a region within box 310 that a user can tap to take a picture of a receipt that documents the purchase.

FIG. 4 shows an example of a user interface 400 of the expense report application that displays the unstructured data received from the user. The user may tap the region of the user interface within box 305 and speak the sentences "I ate at Boston Market in New York with Tom White. It cost $19.00." The computing system receives the utterance and converts the speech to text. The computing system displays the text in box 405 of the user interface 400. The computing system may perform text analysis and parts-of-speech tagging on the text of the utterance so that the text may be processed to identify data for the expense report.

The user may tap the region of the user interface within box 310 to take a picture of a receipt, and the computing system displays an image of the receipt in box 410. The computing system may perform optical character recognition (OCR) on the image of the receipt to identify text in the image. The computing system may perform text analysis and parts-of-speech tagging on the text of the image so that the text may be processed to identify data for the expense report or to resolve ambiguities in the data obtained from the utterance. To resolve ambiguities in the data obtained from the utterance using the text of the image, the computing system may obtain information from the image such as company name, location, financial value, and time, and compare the data obtained from the utterance with the information from the image.

Referring again to FIG. 2, the computing system identifies an attribute associated with a structured data collection. The computing system may provide a set of attributes from which an application developer or database administrator can select certain attributes to associate with a structured data collection. Each attribute of the set of attributes is associated with rules, name catalogs, and historical data that the computing system uses to identify one or more terms from the unstructured data as being associated with the attribute. The developer or administrator may specify a label for each selected attribute that is appropriate for the situation represented by the structured data collection. The developer or administrator may change the number and type of attributes selected as the needs and demands of the users of the application and the structured data collection change.

For example, the computing system may provide a set of attributes that include person, restaurant, city, company, phone number, email, and amount. A developer of the expense report application shown in FIG. 3 and FIG. 4 selects person, restaurant, city, and amount from the set of attributes. The developer specifies names for each of the selected attributes that are appropriate for an expense report. For the expense report application shown in FIG. 3 and FIG. 4, the developer has specified "Restaurant" for the restaurant attribute, "City" for the city attribute, "Price" for the amount attribute, and "Attendees" for the person attribute. For an expense report generated by the expense report application, the computing system identifies restaurant, city, amount, and person as the attributes.

Additionally, the developer or administrator may change the number and type of attributes to reduce ambiguities in the identification of terms for the structured data collection and increase the chances of correctly identifying terms for the structured data collection. For example, identifying terms for both a restaurant attribute and a city attribute may result in a high number of mistakes due to ambiguities that arise when the terms reference a restaurant name that includes a name of a city, such as "Boston Market". The developer or administrator, knowing that the city attribute is not actively used in additional analysis of the expense report, may remove the city attribute from the expense report. With the city attribute removed from the expense report, the computing system can correctly identify terms, such as "Boston Market", as being associated with the restaurant attribute.

Referring again to FIG. 2, the computing system obtains rules, name catalogs, and historical data associated with the attribute at 206. The rules, name catalogs, and historical data may be used to identify one or more terms from the unstructured data as being associated with the attribute. The name catalogs and historical data may be used to resolve ambiguities associated with identifying one or more terms from the unstructured data. For example, the one or more terms identified from the unstructured data using the rules may be compared with data from the name catalogs and historical data to resolve ambiguities in the identified terms.

The rules may be used to identify one or more terms from the unstructured data as being associated with the attribute. The rules of the attribute may specify predefined patterns or characteristics of a text string that may be identified as being associated with the attribute. For example, a rule for the amount attribute may specify that a text string that includes a series of numbers and a "$" symbol may be identified as being associated with the amount attribute.

A name catalog may be used to identify one or more terms from the unstructured data as being associated with an attribute corresponding to the name catalog. The name catalogs associated with the attribute may be, for example, a list of entity names that are associated with the attribute. For example, a name catalog for the restaurant attribute may include "Boston Market" as an entity name that is associated with the restaurant attribute. The terms of the unstructured data may be compared to the entity names in the name catalogs to find a match. Terms that have matching entity names in a name catalog may be identified as being associated with the attribute corresponding to the name catalog.

The name catalogs may be used to resolve ambiguities associated with identifying the terms. For example, terms identified as being associated with two or more attributes using each attribute's rules may be compared with terms in each attribute's name catalog. If the terms identified using the rules match terms in one attribute's name catalog but not the other attribute's name catalog, the terms are more likely associated with the attribute in which the matching terms were found in the corresponding name catalog.

Historical data associated with the attribute may include one or more terms that were previously entered or verified by one or more users as being associated with the attribute. The historical data for an attribute may be collected from multiple different users' input data and from multiple different structured data collections. Similar to the name catalogs, the historical data may be used to identify one or more terms from the unstructured data and to resolve ambiguities associated with identifying the terms. For example, terms in the unstructured data may be associated with an attribute when the terms are included in the historical data for the attribute. The computing system may use the historical data to improve and expand the rules and name catalogs associated with the attribute.

The computing system obtains additional data associated with the user of the computing system at 208. Additional data associated with the user can include, for example, information about the user's location, contacts, calendars, events, tasks, language use history, social media history, and preferences. The additional data may be used to identify one or more terms from the unstructured data as being associated with the attribute. The additional data may be used to resolve ambiguities associated with identifying one or more terms from the unstructured data.

The computing system may obtain geographic coordinates specifying the user's geographic location from a GPS sensor or cellular triangulation. The coordinates may be used to obtain location information from a location service. The location information may be, for example, a name of the city, state, country, or business at the geographic location specified by the user's geographic coordinates. The location information may be used to determine the currency being used or the rate of exchange. The computing system may compare terms from the unstructured data with information obtained based on the user's location to resolve ambiguities. For example, terms in the unstructured data may be associated with an attribute when the terms are associated with the location information and the location information is associated with the attribute.

The computing system may obtain information from the user's contacts database, calendars, or tasks lists. Information from the user's contacts database may include, for example, names, phone numbers, addresses, and emails of the user's contacts. Information from the user's calendar and tasks lists may include, for example, event locations, phone numbers, addresses, and attendees. The computing system may compare terms from the unstructured data with information obtained from the user's contacts database, calendars, events lists, or tasks lists to resolve ambiguities. For example, terms in the unstructured data may be associated with an attribute when the terms are associated with the information obtained from the user's contacts database, calendars, or tasks lists and the information obtained from the user's contacts database, calendars, or tasks lists is associated with the attribute.

The computing system may obtain information associated with the user's language use history. The user's language use history includes terms that were previously entered or verified by the user as being associated with the attribute. The computing system may compare terms from the unstructured data with terms from the user's language use history to resolve ambiguities. For example, terms in the unstructured data may be associated with an attribute when the terms in the unstructured data matches terms that were previously entered or verified by the user as being associated with the attribute.

The computing system may obtain information associated with the user's social media history and preferences from social media sites and other websites with which the user interacts. The user's social media history and preferences may include information associated with people and places. These associations may be used to derive proper nouns of people, places, and things. The computing system may compare terms from the unstructured data with information associated with the user's social media history and preferences. For example, terms in the unstructured data may be associated with an attribute when the terms are associated with the information obtained from the user's social media history or preferences and the information obtained from the user's social media history and preferences is associated with the attribute.

When using more than one type of additional data to resolve ambiguities, the additional data may be associated with an accuracy modifier based on the type of data. For example, language use history matches could be considered 1.2 times more likely to be correct than social media history matches. In some implementations, the accuracy modifiers for each type of additional data may be set by an application developer as an application configuration. In some implementations, the accuracy modifiers for each type of additional data may be set based on the history of resolving ambiguities using that data type. For example, if the history for resolving ambiguities using social media history shows that ambiguities are correctly resolved 50% of the time and the history for resolving ambiguities using language use history shows that ambiguities are resolved 75% of the time, the accuracy modifier for social media history will be lower than the accuracy modifier for language use history.

The computing system may obtain other data from external systems and services as alternatives or in addition to the data described above. For example, the computing system may obtain data from applications external to the expense report application. As another example, the computing system may obtain data from cloud-based services such as cloud-based computing and storage services. The computing system may use such data to identify one or more terms from the unstructured data as being associated with an attribute or to resolve ambiguities associated with identifying one or more terms from the unstructured data.

The computing system identifies one or more terms from the unstructured data as being associated with the attribute at 210. To identify one or more terms, the computing system identifies text in the unstructured data and performs text analysis and part-of-speech tagging on the text of the unstructured data. The computing system may apply the attribute rules to the text of the unstructured data. The computing system may compare the text of the unstructured data to the entity names in the name catalogs associated with the attribute, the historical data associated with the attribute, or the additional data associated with the user. For the expense report application shown in FIG. 4, the computing system has identified "Boston Market" as a restaurant attribute corresponding to the label "Restaurant," "New York" as a city attribute corresponding to the label "City," "$19.00" as an amount attribute corresponding to the label "Price," and "Tom White" as a person attribute corresponding to the label "Attendees." The computing system displays the identified terms associated with the corresponding attributes in the user interface 400.

Referring again to FIG. 2, the computing system stores the identified one or more terms in a data record of the structured data collection at 212. The computing system may store the identified terms in response to receiving a verification from the user that the terms were correctly identified by the computing system and are to be associated with the attribute. To store the identified terms in, for example, a data record of a database table, the computing system may store the identified terms in a cell within a row associated with the data record and within a column associated with the attribute. The computing system may use correctly identified terms to improve and expand the rules and name catalogs associated with the attribute.

FIG. 5 shows an example of a user interface 500 that displays data from a structured data collection. In FIG. 5, the data from the structured data collection is displayed in a user interface component 502 that visually represents a database table or a spreadsheet with the rows of the table or spreadsheet displaying data associated with a data record and the columns of the table or spreadsheet displaying data associated with an attribute. The user can view the data from the structured data collection to confirm that the data is correct and to perform additional analysis on the data.

A number of implementations have been described. Nevertheless, it will be understood that various modifications may be made. For example, other methods described herein besides or in addition to that illustrated in FIG. 2 may be performed. Further, the illustrated steps of process 200 may be performed in different orders, either concurrently or serially. Further, steps may be performed in addition to those illustrated in process 200, and some steps illustrated in process 200 may be omitted without deviating from the present disclosure. Accordingly, other implementations are within the scope of the following claims.

What is claimed is:

1. A method performed with a computing system for obtaining data from unstructured data for a structured data collection, the method comprising:
receiving unstructured data that includes text;
identifying an attribute associated with a structured data collection;
obtaining historical data associated with the attribute and two or more different types of additional data associated with a user of the computing system, wherein each additional datum is associated with an accuracy modifier based on the type of the additional datum;
identifying one or more terms from the unstructured data as being associated with the attribute based on at least one of the historical data and the additional data, wherein identifying the one or more terms includes resolving ambiguities in the identified terms based on the accuracy modifier associated with each additional datum;
storing the identified one or more terms in a data record of the structured data collection; and
preparing for display the data record of the structure data collection.

2. The method of claim 1, wherein receiving unstructured data that includes text comprises:
receiving a natural language utterance; and
converting the natural language utterance into the text.

3. The method of claim 1, wherein receiving unstructured data that includes text comprises:
receiving an image containing the text; and
performing optical character recognition on the image to identify the text.

4. The method of claim 1, wherein obtaining historical data associated with the attribute comprises obtaining a set of one or more terms previously identified as being associated with the attribute; and identifying one or more terms from the unstructured data as being associated with the attribute based on the historical data comprises identifying one or more terms from the unstructured data that is included in the set of one or more terms previously identified as being associated with the attribute.

5. The method of claim 1, wherein obtaining two or more different types of additional data associated with a user of the computing system comprises at least one of (i) obtaining a location associated with the user or (ii) accessing a contacts database associated with the user; and
identifying one or more terms from the unstructured data as being associated with the attribute based on the additional data comprises at least one of (i) identifying one or more terms from the unstructured data that is associated with the location and the location is associated with the attribute, or (ii) identifying one or more terms from the unstructured data that is associated with information in the contacts database and the information in the contacts database is associated with the attribute.

6. The method of claim 1, further comprising:
receiving an input from the user to associate the one or more terms with the attribute; and
including the one or more terms in the historical data associated with the attribute.

7. The method of claim 1, further comprising:
receiving an input from an administrator of the structured data collection to associate the attribute with the structured data collection, the attribute being from a predetermined set of available attributes, and each attribute from the predetermined set of available attributes being associated with historical data.

8. A non-transitory computer readable storage medium encoded with a computer program, the program comprising instructions that when executed by one or more computers cause the one or more computers to perform operations comprising:
receiving unstructured data that includes text;
identifying an attribute associated with a structured data collection;
obtaining historical data associated with the attribute and two or more different types of additional data associated with a user of the computing system, wherein each additional datum is associated with an accuracy modifier based on the type of the additional datum;
identifying one or more terms from the unstructured data as being associated with the attribute based on at least one of the historical data and the additional data, wherein identifying the one or more terms includes resolving ambiguities in the identified terms based on the accuracy modifier associated with each additional datum;
storing the identified one or more terms in a data record of the structured data collection; and
preparing for display the data record of the structure data collection.

9. The non-transitory computer readable storage medium of claim 8, wherein receiving unstructured data that includes text comprises:
receiving a natural language utterance; and
converting the natural language utterance into the text.

10. The non-transitory computer readable storage medium of claim 8, wherein receiving unstructured data that includes text comprises:
receiving an image containing the text; and
performing optical character recognition on the image to identify the text.

11. The non-transitory computer readable storage medium of claim 8, wherein obtaining historical data associated with the attribute comprises obtaining a set of one or more terms previously identified as being associated with the attribute; and
identifying one or more terms from the unstructured data as being associated with the attribute based on the historical data comprises identifying one or more terms from the unstructured data that is included in the set of one or more terms previously identified as being associated with the attribute.

12. The non-transitory computer readable storage medium of claim 8, wherein obtaining two or more different types of additional data associated with a user of the computing system comprises at least one of (i) obtaining a location associated with the user or (ii) accessing a contacts database associated with the user; and
identifying one or more terms from the unstructured data as being associated with the attribute based on the additional data comprises at least one of (i) identifying one or more terms from the unstructured data that is associated with the location and the location is associated with the attribute, or (ii) identifying one or more terms from the unstructured data that is associated with information in the contacts database and the information in the contacts database is associated with the attribute.

13. The non-transitory computer readable storage medium of claim 8, wherein the operations further comprise:
receiving an input from the user to associate the one or more terms with the attribute; and
including the one or more terms in the historical data associated with the attribute.

14. The non-transitory computer readable storage medium of claim 8, wherein the operations further comprise:
receiving an input from an administrator of the structured data collection to associate the attribute with the structured data collection, the attribute being from a predetermined set of available attributes, and each attribute from the predetermined set of available attributes being associated with historical data.

15. A system of one or more computers configured to perform operations comprising:
receiving unstructured data that includes text;
identifying an attribute associated with a structured data collection;
obtaining historical data associated with the attribute and two or more different types of additional data associated with a user of the computing system, wherein each additional datum is associated with an accuracy modifier based on the type of the additional datum;
identifying one or more terms from the unstructured data as being associated with the attribute based on at least one of the historical data and the additional data, wherein identifying the one or more terms includes resolving ambiguities in the identified terms based on the accuracy modifier associated with each additional datum;
storing the identified one or more terms in a data record of the structured data collection; and
preparing for display the data record of the structure data collection.

16. The system of claim 15, wherein receiving unstructured data that includes text comprises:
receiving a natural language utterance; and
converting the natural language utterance into the text.

17. The system of claim 15, wherein receiving unstructured data that includes text comprises:
  receiving an image containing the text; and
  performing optical character recognition on the image to identify the text.

18. The system of claim 15, wherein obtaining historical data associated with the attribute comprises obtaining a set of one or more terms previously identified as being associated with the attribute; and
  identifying one or more terms from the unstructured data as being associated with the attribute based on the historical data comprises identifying one or more terms from the unstructured data that is included in the set of one or more terms previously identified as being associated with the attribute.

19. The system of claim 15, wherein obtaining two or more different types of additional data associated with a user of the computing system comprises at least one of (i) obtaining a location associated with the user or (ii) accessing a contacts database associated with the user; and
  identifying one or more terms from the unstructured data as being associated with the attribute based on the additional data comprises at least one of (i) identifying one or more terms from the unstructured data that is associated with the location and the location is associated with the attribute, or (ii) identifying one or more terms from the unstructured data that is associated with information in the contacts database and the information in the contacts database is associated with the attribute.

20. The system of claim 15, wherein the operations further comprise:
  receiving an input from the user to associate the one or more terms with the attribute; and
  including the one or more terms in the historical data associated with the attribute.

21. The system of claim 15, wherein the operations further comprise:
  receiving an input from an administrator of the structured data collection to associate the attribute with the structured data collection, the attribute being from a predetermined set of available attributes, and each attribute from the predetermined set of available attributes being associated with historical data.

\* \* \* \* \*